United States Patent [19]
Kovari

[11] Patent Number: 5,337,613
[45] Date of Patent: Aug. 16, 1994

[54] MEASURING INSTRUMENT FOR DETERMINING DISPLACEMENTS IN SOIL, ROCK, FOUNDATION SOIL OR CONSTRUCTION MATERIALS

[76] Inventor: Kalman Kovari, Stettbachstrasse 6, 8702 Zollikon, Switzerland

[21] Appl. No.: 937,378

[22] Filed: Aug. 31, 1992

[30] Foreign Application Priority Data

Aug. 29, 1991 [CH] Switzerland .................. 02538/91

[51] Int. Cl.$^5$ ............................................. G01B 5/00
[52] U.S. Cl. ............................................ 73/784; 73/84
[58] Field of Search ................. 73/784, 84, 786, 849

[56] References Cited

FOREIGN PATENT DOCUMENTS

| | | | |
|---|---|---|---|
| 2701394 | 7/1978 | Fed. Rep. of Germany | 33/1 H |
| 636698 | 6/1983 | Switzerland . | |
| 675910 | 11/1990 | Switzerland . | |
| 607980 | 5/1978 | U.S.S.R. | 73/784 |

OTHER PUBLICATIONS

Deflectometer, 1 page, "Indicating of Lateral Displacements. Relative Measurements in any Included Boreholes".

Rock Mechanics, Supp. 8, pp. 349-367, 1979, S. Hata, et al., "Field Measurements and Consideration on Deformability of Izumi Layers".

*Primary Examiner*—Thomas Noland
*Attorney, Agent, or Firm*—Oblon, Spivak, McClelland, Maier & Neustadt

[57] ABSTRACT

A measuring instrument includes first and second rigid, elongate measuring elements which are interconnected by a flexible element. The measuring elements are supported in a measuring tube inserted in the foundation soil. Whenever a displacement occurs in the foundation soil or construction, the measuring tube is deformed and the second measuring element is pivoted with respect to the first measuring element. The curvature or bending which thereby occurs in the flexible element of suitable dimensioning or configuration is preferably determined by at least one wire strain gage fitted to the flexible element in the plane of deformation, the elongations being converted, for example by use of a Wheatstone bridge circuit, into proportional electrical current or voltage signals. Preferably, wire strain gages are disposed on all four mutually perpendicular outer sides of the flexible element, in order to allow for the detection of displacements in mutually perpendicular planes.

6 Claims, 4 Drawing Sheets

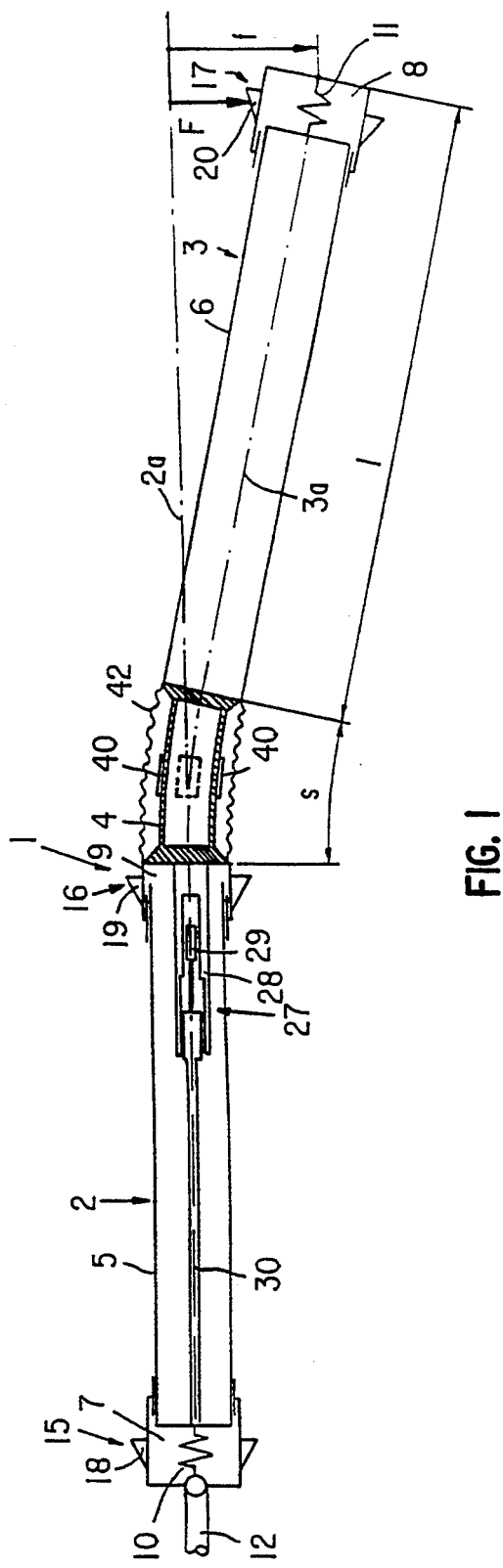
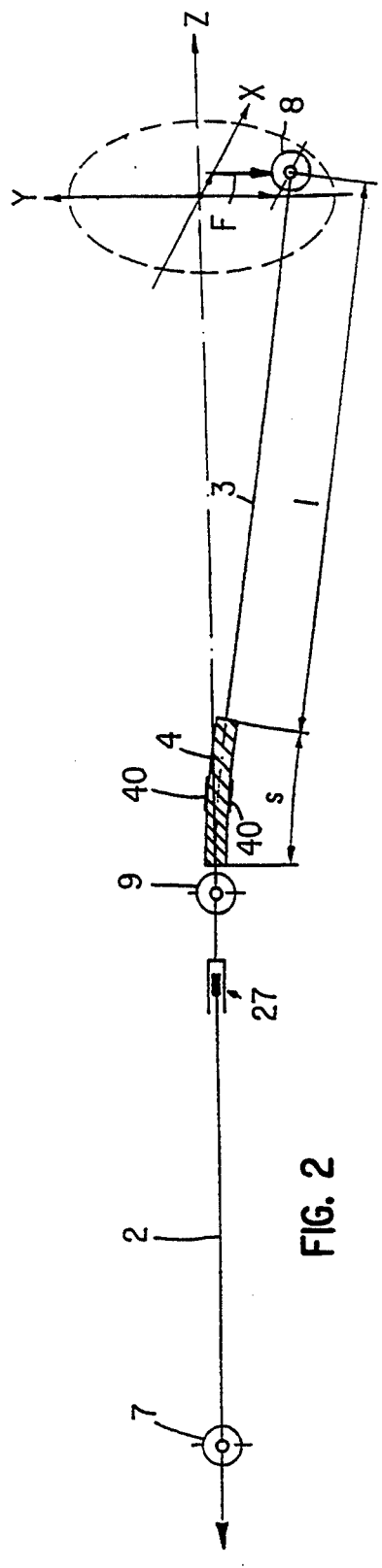
FIG. 1
FIG. 2

MEASURING INSTRUMENT FOR DETERMINING DISPLACEMENTS IN SOIL, ROCK, FOUNDATION SOIL OR CONSTRUCTION MATERIALS

BACKGROUND OF THE INVENTION

1. Field of the Invention

The present invention relates to a measuring instrument for determining displacements, preferably those in the soil, rock, foundation soil or construction materials, which include first and second hinge-coupled elongate, substantially rigid measuring elements, and a measuring device for determining changes of position of the first and second measuring elements relative to each other, brought about by pivoting of the first measuring element relative to the second measuring element, wherein the measuring device includes a flexible element interconnecting the first and second measuring elements and a mechanism for determining the curvature or bending of the flexible element which occurs by pivoting of the first measuring element relative to the second measuring element, as a measure of relative displacement in the foundation soil or construction.

2. Discussion of the Background

Measuring instruments of this type are known from CH-PS 636698 and CH-PS 675910, the use of which make it possible to determine displacements occurring in the foundation soil, constructions or other materials, which have the effect of changing the relative position of two measuring elements in a direction running transversely to the longitudinal axis of the instrument. The measuring device known from the first-named patent specification exhibits an inductive length measuring system, by which, when a measuring element is pivoted out of the reference direction defined by the aligned longitudinal axes of the measuring elements, the size of the deviation from this reference direction is determined. The length measuring system which is used has the disadvantage that it is prone to producing measuring errors. The measuring method using the known instrument is expensive, since the instrument exhibits a large diameter such that a correspondingly large borehole diameter is required when determining displacements in the foundation soil. The instrument is also awkward to use and is not watertight, so that it cannot be employed in a water-filled borehole.

In the case of the instrument known from the second-named patent specification, there is disposed in the one measuring element a laser light transmitter, the emitted laser beam of which, aligned with the longitudinal axis of this measuring element, strikes a receiver which is disposed in the other measuring element and has a photo-detector device, so that if, in the foundation soil, a transverse displacement has occurred which results in pivoting of the measuring elements relative to each other, the laser beam striking the photo-detector device is deflected out of its zero position, the extent of this deflection being determinable by an evaluation circuit. The measuring method is accurate and also allows measurements in two mutually perpendicular lanes, but it is expensive since the electronics are very complex. The measuring range is relatively small and the instrument, due to the optical components present, is sensitive to humidity so that, for this reason and also for the reason of cost, a fixed installation of the instrument into a borehole is out of the question.

In addition, "deflectometers" are known (e.g. the INTERFELS-EASTMAN system), in which a measuring member anchored in a borehole is disposed between two endpieces, which measuring member is cardanically connected, by means of spacing tubes, to the two endpieces. A tensioned wire, extending from the one to the other endpiece and through the tubes and measuring member, is precisely mounted, by means of precision cutters disposed in the endpieces and in the measuring member, and an inductive path sensor is disposed in the measuring member such that it is able to measure a change in the position of the measuring wire resulting from a transverse displacement. In the case of a "chain-deflectometer", this extended embodiment contains a plurality of consecutive measuring embers. The instrument possesses a large diameter, requiring correspondingly large borehole diameters, so that the measuring method is relatively expensive to use. Moreover, the measurement of displacements is only possible in one plane. Any slackening of the tension of the measuring wire affects the measuring accuracy.

In addition, it has also been proposed (e.g. Publication: "Rock Mechanics Suppl. 8" (pages 349–367, Springer Verlag 1979)) to fit wire strain gages in the interior of an aluminum tube encased in concrete in a borehole, in order to measure the bending elongations in the aluminum tube caused by transverse displacements in the foundation soil. However, only a low level of measuring accuracy is thereby obtained, the measuring results also being erroneous if there is a strong shearing deformation between two neighboring measuring points. Fitting of wire strain gages in the interior of a tube is complicated and costly and there is no facility for calibration under this method.

SUMMARY OF THE INVENTION

The object of the present invention is therefore to provide a measuring instrument of the type specified in the introduction which is very simply built and inexpensive, which is robust and watertight and exhibits small dimensions and which can be used both as a fixed-installation instrument and as a portable instrument. The instrument should additionally possess high measuring sensitivity and accuracy and should be flexible with respect to the choice of measuring ranges and should also provide a clear, non-falsified relation between the transverse displacement to be measured and the measured value and allow measurements in two mutually perpendicular planes.

The object is achieved according to the invention by means of the features appearing in the claims set forth hereinbelow:

Where the instrument according to the invention has a given measuring length, the interposition of a flexible intermediate element between the two essentially rigid, elongate measuring elements enables greater measuring sensitivity to be obtained than in the case of a one-piece flexible support of the same measuring length without a flexible intermediate element of this kind. The flexural rigidity of the flexible element can be kept relatively low by suitable design of this flexible element or by a suitable choice of material, thereby giving rise, even in the case of low transverse forces, to a sufficiently large deflection, already measurable on the flexible element, of the one measuring element in relation to the other measuring element.

Very precise measurements can thus be undertaken even in the case of relatively large measuring lengths and low transverse forces.

The curvature of the flexible element interconnecting the two rigid measuring elements can be determined, in a preferable manner, by means of wire strain gages. In a preferred manner, the elongations can be converted by means of a Wheatstone bridge circuit into proportional electrical current or voltage signals.

Preferred further designs of the measuring instrument according to the invention are the subject of the dependent claims.

BRIEF DESCRIPTION OF THE DRAWINGS

An illustrative embodiment of the subject of the invention and various modifications of the design of the measuring member are explained in greater detail below by means of the drawings, in which, in purely diagrammatic representation:

FIG. 1 shows the measuring instrument according to the invention, in a side view;

FIG. 2 shows the measuring principle, in a simplified representation compared with FIG. 1;

DESCRIPTION OF THE PREFERRED EMBODIMENTS

Figure 3A:
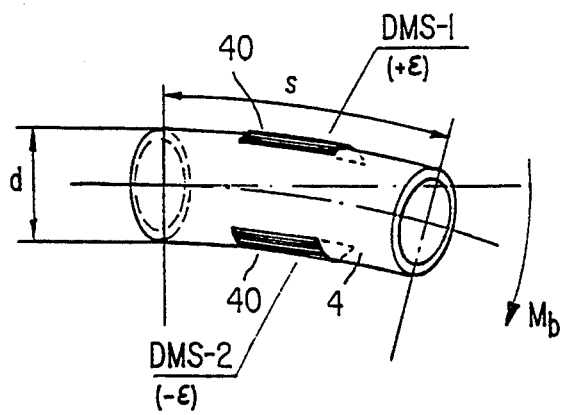
FIG. 3a shows the flexible element of the measuring instrument on a larger scale.
Figure 4A:
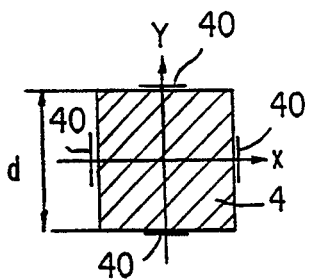
FIGS. 4a–4f show various cross-sectional shapes of the flexible element.
Figure 4B:
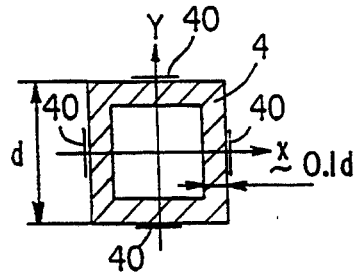
Figure 4C:
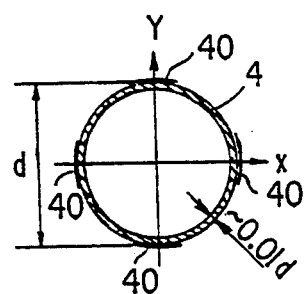
Figure 4D:
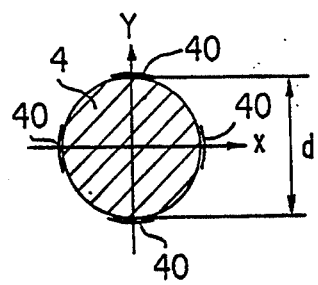
Figure 4E:
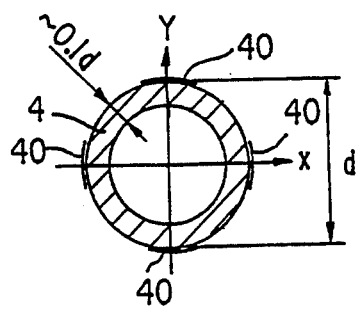
Figure 5:
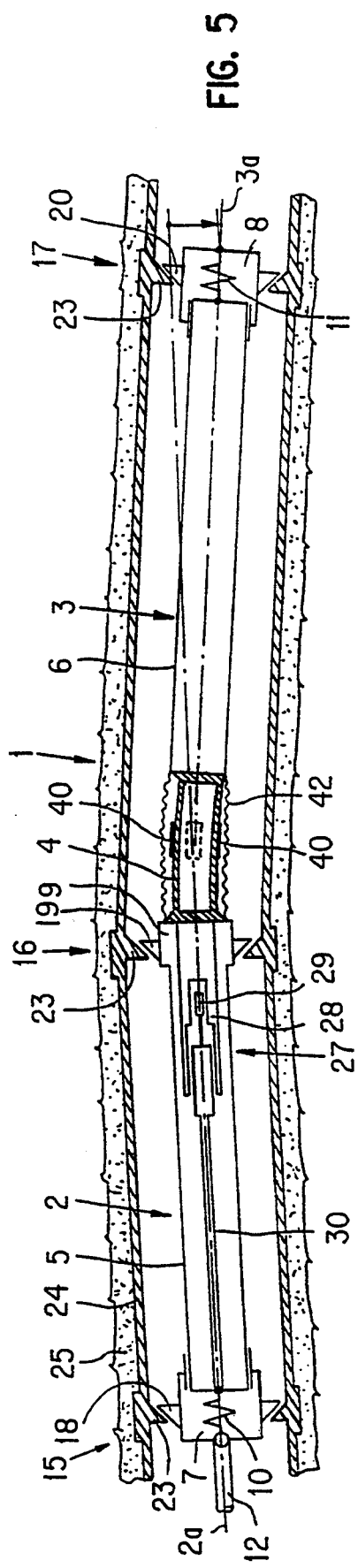
FIG. 5 shows the measuring instrument according to FIGS. 1 and 2 in the measuring position in the foundation soil.

The measuring instrument 1 represented diagrammatically in FIGS. 1, 2 and 5 exhibits two elongate measuring elements 2 and 3, which are interconnected by a flexible element 4 disposed between them. In the represented example, the flexible element 4 is a hollow body in the form of a cylindrical tubular section, for example according to FIG. 3a. The hollow body can also, however, exhibit a rectangular cross section, for example according to FIG. 4b. The measuring elements 2 and 3 respectively comprise a tubular piece 5 or 6 and at the free end of the tubular piece 5, a measuring head 7 and, additionally, at the free end of the tubular piece 6, a measuring head 8 is in each case connected non-rotatably to the tubular piece, yet in relation to the respective tubular piece connected displaceably in the direction of the longitudinal axes 2a and 3a respectively of the measuring elements 2 and 3. A further measuring head 9 at the other end of the tubular piece 5, facing the flexible element 4, is not longitudinally displaceable. Between the measuring element 2 and the assigned measuring head 7 is disposed a tension spring 10, and between the measuring head 3 and the assigned measuring head 8, is positioned a tension spring 11. A pull rod 12 acts upon the measuring head 7.

Each of the measuring heads 7, 8 and 9 includes a supporting device 15, 16 and 17, respectively, which is formed in each case by stops 18, 19 and 20 respectively distributed on the periphery of the corresponding measuring head 15, 16 and 17. The stops 18, 19 and 20 lie in each case in a plane running approximately at right-angles to a longitudinal axis 2a or 3a of the corresponding measuring head 2 or 3. As can be seen from FIG. 5, the stops 18, 19 and 20 interact with counter-stops 23, which are configured on the inner side at corresponding intervals on a measuring tube 24 which is embedded in the foundation soil 25 to be investigated. If, for the stops 18, 19 and 20 on the measuring heads, four are in each case distributed, offset by 90°, over the periphery and the counter-stops 23 are distributed on the inner side of the measuring tube 24 in the same manner, i.e. four stops respectively offset by 90° over the periphery, then the instrument 1 can be introduced into the measuring tube 24 in a rotary position, in which the stops 18, 19 and 20 are respectively located in a gap between neighboring counter-stops 23 of the measuring tube 24, whereupon the stop position according to FIG. 5 is obtained by rotation of the instrument 1. By drawing on the pull rod 12, the stops 18, 19 and 20 are then pressed against the counter-stops 23, the tension springs 10 and 11 ensuring the necessary contact pressure. This construction is also derived from CH-PS 675910 and CH-PS 636 698 (and corresponding U.S. Pat. No. 4,327,590).

Within the measuring tube 2, a path sensor 27 is housed. This can be configured as a differential transformer and can include a stationary part 28 bearing a transformer winding, in which part there is disposed a solenoid plunger 29, which is fastened to the end of a bar 30 which extends in the direction of the longitudinal axis 2a of the measuring element 2 and is fastened to the measuring head 7. If the distance between the measuring heads 7 and 9 changes, then the solenoid plunger moves relative to the stationary part 28, thereby giving rise, in a known manner, to the generation of an electric signal proportional to the degree of movement of the solenoid plunger. The output signal of this path sensor 27 is evaluated, in a non-represented manner, by means of a evaluating circuit. In this manner, it is possible to establish whether, as a result of site displacements, a change has come about in the distance between the counter-stops 23, i.e. it can be established whether a change of position has occurred in the direction of the z-axis according to FIG. 2. A path sensor is also described in CH-PS 675910 or CH-PS 636 698.

In order now to be able, in particular, to detect displacements in the foundation soil or in constructions in the directions x and y according to FIG. 2, at right-angles respectively to the direction of the z-axis, wire strain gages 40 are fastened to the outer side of the flexible element 4. Using two mutually opposite wire strain gages, a displacement in one of the two directions x and y can be detected and, if four wire strain gages 40 are in each case distributed, offset by 90°, over the periphery, a determination of the displacement in both directions x and y can be executed. With the aid of the wire strain gage, the curvature or bending of the flexible element 4 is measured. The curvature produces on the one side of the flexible element a positive elongation and on the opposite side a negative elongation (i.e. change in length). Where the flexible element exhibits a mirror-symmetrical cross section, then the positive and negative elongations are of the same amount. According to FIG. 3a, on the flexible element 4 a first wire strain gage 40 is disposed on the convex side of the element and a second wire strain gage 40 on the concave side.

Figure 3B:
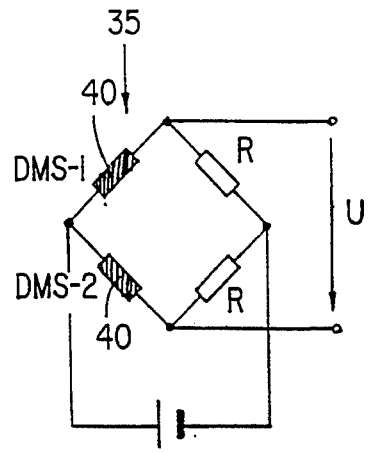
FIG. 3b shows diagrammatically the principle for determining the elongation using the Wheatstone bridge.

In FIG. 3b, a diagrammatic representation shows that, using the known Wheatstone bridge circuit 35, the elongations can be converted into proportional electrical current or voltage signals. As can be seen from FIG. 3b, within the bridge circuit two members of the same are formed by the wire strain gages 40. Where the flexible element 4 exhibits a mirror-symmetrical cross section, which is the case in all represented examples according to FIG. 3a and according to FIGS. 4a–4f, then the Wheatstone bridge circuit offers, moreover, the option of summing the elongation signals for the purpose of enhancing the measuring sensitivity and, additionally, the option of compensating for disturbance variables acting upon the flexible element, such as torsion, thermal expansion and normal load.

Figure 4F:
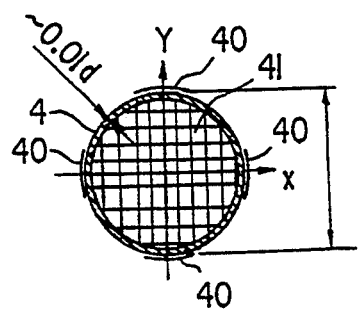

From FIG. 5, it can be seen that, owing to a transverse displacement which has occurred in the foundation soil or in the structure, the measuring tube 24 is no longer rectilinear. Between the axes 2a and 3a of the two measuring elements 2 and 3, a relative displacement amounting to length f has occurred. The measuring range corresponding to this relative displacement f and the measuring sensitivity of the instrument are a function of the distance d between the mutually opposite wire strain gages 40 on the flexible member 4 (FIG. 3a and 4a–4f) and are additionally a function of the length s of the flexible element 4 and of the length 1 of the measuring element 3 (FIGS. 1 and 2). The force F which is necessary for the deflection of the measuring element 3 is a function of the modulus of elasticity of the flexible element 4 and of the geometry of its cross section (moment of inertia J) and of the length s of the flexible element and of the length 1 of the measuring element 3 (FIG. 2). According to requirements, the cross section of the flexible element 4 can therefore, according to FIG. 4a, be a square cross section of solid material or, according to FIG. 4b, be a square cross section of a hollow profile or, according to FIG. 4c, be a circular cross section of a tube, which tube, according to FIG. 4e, can also have a greater wall thickness. A thin-walled tube can also, according to FIG. 4f, contain a supporting filling 41, for example silicone rubber, to prevent denting of the tube wall. According to FIG. 4d, the flexible element 4 comprises a solid material rod of circular diameter. The solid material cross sections have the advantage that these flexible elements are inexpensive and very robust, but have the disadvantage that they exhibit a high moment of inertia and high measuring forces are therefore necessary. The same, though less markedly, also applies to the thick-walled hollow profiles as a flexible element. Thin-walled hollow profiles, on the other hand, have the advantage that lesser measuring forces are necessary, but have the disadvantage that the tube wall can be dented or buckled, this, however, being preventable, as described, by use of a supporting filling (FIG. 4f). A relatively robust embodiment of a thin-walled hollow profile as a flexible element can be created by using high-strength steel or beryllium bronze.

All hollow profiles additionally have the advantage that the wire strain gages 40 can also be fitted in the interior of the hollow profile, so that they are protected from mechanical damage. It can be seen from FIG. 5 that, in order to protect the wire strain gages, the flexible element 4 is enclosed by a corrugated, highly flexible spring tube 42, which has no effect upon the measurement.

Regarding the cross-sectional shape of the flexible element which might enter into consideration for the particular application, the rule is that a minimalization of the deflection force F is sought, accompanied by a simultaneous free choice of measuring range f and of measuring sensitivity.

Materials suitable for the flexible element 4 are, for example, elastic plastics such as polyacetal and elastomers. These plastics offer the advantage of a low modulus of elasticity and are therefore favorable for small measuring forces and very large measuring ranges, but have the disadvantages that they are not very robust, are sensitive to normal load and torsion, and are sensitive to temperature influences. Aging can affect the elasticity.

Also feasible as materials are high-strength steel and beryllium bronze, which materials are less sensitive with regard to temperature influences and are robust in relation to torsion forces and high normal load. The disadvantage of these materials is their high modulus of elasticity, thereby necessitating high measuring forces if the profile geometry of the flexible element is unsuitable.

Figure 6:
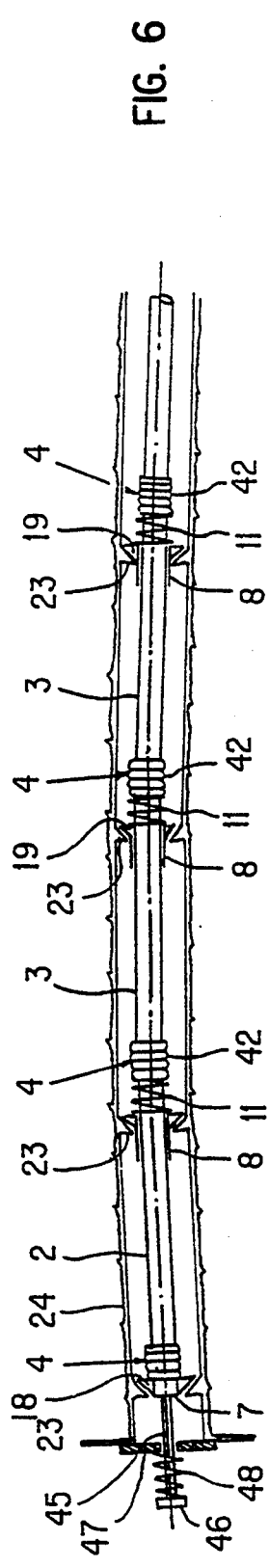
FIG. 6 shows the principle of a measuring chain in the foundation soil, comprising a plurality of measuring instruments.
Figure 7:
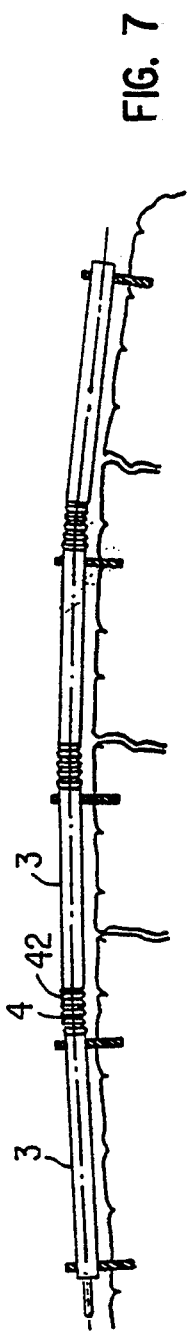
FIG. 7 shows the principle of a measuring chain on the surface of the site, and shows a plurality of measuring instruments.

FIGS. 6 and 7 illustrate diagrammatically that measuring instruments of the type described above can also be lined up in a row to form a chain-like measuring system. FIG. 6 shows such a system, which is fixedly installed in the foundation soil or the earth, the measuring elements being tightly clamped therein. FIG. 7 shows a system of this type disposed on the surface of a site. In this case, a flexible element 4 enclosed by a spring tube 42, which is visible in FIGS. 6 and 7, is disposed between each pair of measuring elements 3. In this manner, displacements can be detected, according to FIG. 6, in the area of a long borehole or, according to FIG. 7, faults in the site.

The measuring instrument according to FIG. 6, just like the measuring instrument according to FIG. 5, exhibits measuring heads 7, 8, which are displaceable to a certain extent against the action of a tension spring 11. The measuring heads 7, 8 are provided with stops 18, 19, which interact with counter-stops 23 in the interior of a measuring tube 24 inserted into a borehole. The measuring head 7 is acted upon by a pull rod 45, which, at the free end, bears a supporting plate 46. Between this supporting plate 46 and a borehole cover 47 there is clamped a strong tension spring 48, which ensures that the stops 18, 19 are pressed against the assigned counter-stops 23.

The insertion of the instrument is carried out basically in the same manner as the instrument according to FIG. 5 (and as more fully described in the already mentioned CH-PS 636 698 and the corresponding U.S. Pat. No. 4,327,590). The measuring instrument shown in FIG. 6 remains, as already mentioned, fixedly installed in the borehole, but can be removed again from the borehole once the tension spring 48 has been removed.

Figure 8:
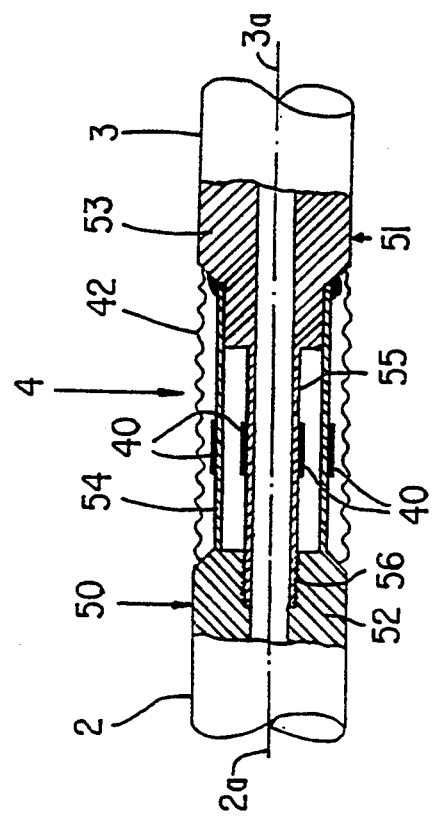
FIG. 8 shows the flexible element in a special construction form.

FIG. 8 illustrates a special embodiment of a flexible element, comprising in principle two coaxial and interlocking parts 50 and 51. Each of the parts 50, 51 consists of a head piece 52, 53 and a tubular, flexible extension part 54, 55 which forms with the head piece a single part. The extension part 55 bears at its end a thread 56, by which the part 51 is screwed into the head piece 52 of the other part 50. The extension part 54 of part 50 is connected, as indicated at 57, to the head piece 53 of the part 51, e.g. by soldering or welding. Both extension parts 54, 55 are supports for wire strain gages 40, which, as already described earlier, are protected by means of a highly flexible, corrugated spring tube 42. In various applications, a high measuring sensitivity is initially desirable when carrying out a measuring exercise, without at the same time having to forego a large measuring range corresponding to the relative displacement f in FIG. 5. Where there is only one part 50, 51 or extension part 54, 55 present as a flexible element, a high measuring sensitivity and a large measuring range are normally mutually exclusive. In the case of the embodiment according to FIG. 8, initially, where there is sufficient deformation, both extension parts 54, 55 or only the outer extension part 54 of larger diameter are used for the measurement. The outer extension part 54 provides high measuring sensitivity. If the deformation then greatly increases, only the inner extension part 55 continues to be used for measurement and possible destruction of the outer extension part 54 is accepted if there is large deformation.

Figure 9:
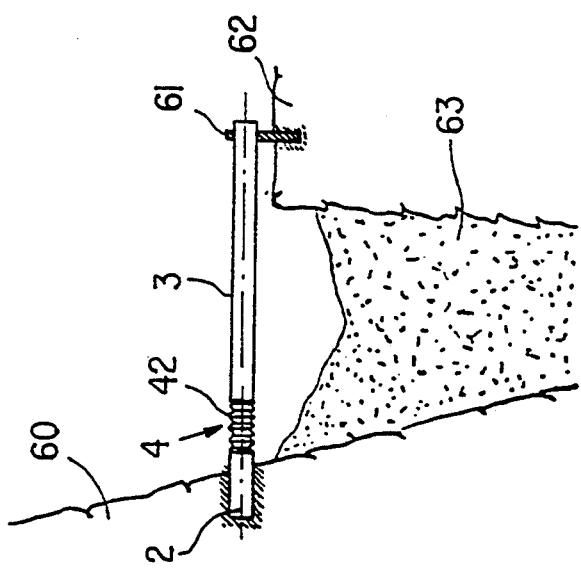
FIG. 9 shows diagrammatically a modified embodiment of the measuring instrument.

A further application using a special construction form is represented diagrammatically in FIG. 9. In this embodiment, the one measuring element 2 of the instrument is very short and is anchored, for example, in rock 60. The second measuring element 3, which is connected by a flexible element 4 to the measuring element 2, is secured by element 61 at its end to the ground or to rock 62, which rock is in danger of breaking off, for example, as in a rock slide. Using this system, the slightest relative displacement in the rock can thus be detected before the landslide occurs. Between the sections of rock 60, 62, a wedge of debris 63 is represented.

Based on the representation according to FIG. 9, it is not difficult to recognize that, using a measuring instrument of the type described, measurements can be taken not only of displacements in the soil or rock or in constructions, but also, quite generally, of relative transverse displacements between two elements of any type. The described measuring instruments allow measurements to be made over a long measuring length at high sensitivity.

In place of wire strain gages, other suitable measuring elements can also be used to determine the curvature or bending of the flexible element 4, e.g. measuring elements working according to the piezoelectric principle.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A measuring instrument for determining displacements in a material, which comprises:
   first and second hinge-coupled elongate, substantially rigid measuring elements for being positioned in the material; and
   a measuring device for determining changes of position of the first and second measuring elements relative to each other, brought about by pivoting of the first measuring element relative to the second measuring element, wherein the measuring device includes a flexible element interconnecting the first and second measuring elements and a mechanism for determining the curvature or bending of the flexible element, which occurs by pivoting of the first measuring element relative to the second measuring element, as a measure of relative displacement in the material by the first and second measuring elements relative to each other, wherein the mechanism for determining the curvature or bending of the flexible element comprises a wire strain gage, fitted on at least one side of the flexible element, and a convertor for converting elongations of the flexible element into at least one of proportional electric current and voltage signals and wherein the flexible element has a substantially mirror-symmetrical cross section and a wire strain gage disposed on both an outer and inner body surface of said flexible element.

2. A measuring instrument as claimed in claim 1, wherein said flexible element comprises a first and second flexible element, said first flexible element having a hollow profile and enclosing and being coaxial with said second flexible element wherein each of the first and second elements includes a wire strain gage mechanism for determining the curvature or bending, respectively, of said first and second elements.

3. A measuring instrument as claimed in claim 1, wherein the first and second measuring elements comprise additional measuring elements wherein the first, second and additional measuring elements are lined up, said flexible element being in each case interposed between successive measuring elements, to form a chain of said measuring elements, and which comprise mechanism assigned to each flexible element for determining the curvature or bending of said flexible element between said measuring elements.

4. A measuring instrument as claimed in claim 1, wherein one end of at least one of said first and second measuring elements is supported in said material and one of said first and second measuring elements connected to said flexible element is telescopically adjustable in length between said flexible element and said one end of said measuring elements supported in the material, and wherein a path sensor is disposed in said one measuring element for additionally indicating positional changes in a longitudinal direction of the first and second measuring elements.

5. A measuring instrument for determining displacements in a material, which comprises:
   first and second hinge-coupled elongate, substantially rigid measuring elements for being positioned in the material; and a measuring device for determining changes of position of the first and second measuring elements relative to each other, brought about by pivoting of the first measuring element relative to the second measuring element, wherein the measuring device includes a flexible element interconnecting the first and second measuring elements and a mechanism for determining the curvature or bending of the flexible element, which occurs by pivoting of the first measuring element relative to the second measuring element, as a measure of relative displacement in the material by the first and second measuring elements relative to each other and wherein flexible element has one of a square and circular cross section and comprises one of a solid material profile and a hollow profile.

6. A measuring instrument for determining displacements in a material, which comprises:
   first and second hinge-coupled elongate, substantially rigid measuring elements for being positioned in the material; and a measuring device for determining changes of position of the first and second measuring elements relative to each other, brought about by pivoting of the first measuring element relative to the second measuring element, wherein the measuring device includes a flexible element interconnecting the first and second measuring elements and a mechanism for determining the curvature or bending of the flexible element, which occurs by pivoting of the first measuring element relative to the second measuring element, as a measure of relative displacement in the material by the first and second measuring elements relative to each other, wherein the mechanism for determining the curvature or bending of the flexible element comprises a wire strain gage, fitted on at least one side of the flexible element, and a converter for converting elongations of the flexible element into at least one of proportional electric current and voltage signals and wherein the flexible element includes a wire strain gage on each of four outer surfaces thereof, each said surface succeeding a preceding surface at a central angle of 90°, said the wire strain gages including circuitry for determining displacements in the material in mutually perpendicular directions.

* * * * *